(12) United States Patent
Namiranian et al.

(10) Patent No.: US 12,036,086 B2
(45) Date of Patent: Jul. 16, 2024

(54) ORTHODONTIC TOOTH MOVEMENT DEVICE, SYSTEMS AND METHODS

(71) Applicant: Align Technology, Inc., San Jose, CA (US)

(72) Inventors: Parshan Namiranian, San Jose, CA (US); Ali Kakavand, San Carlos, CA (US); Eric Kuo, Foster City, CA (US)

(73) Assignee: ALIGN TECHNOLOGY, INC., San Jose, CA (US)

( * ) Notice: Subject to any disclaimer, the term of this patent is extended or adjusted under 35 U.S.C. 154(b) by 114 days.

(21) Appl. No.: 17/330,066

(22) Filed: May 25, 2021

(65) Prior Publication Data
US 2021/0378796 A1    Dec. 9, 2021

Related U.S. Application Data

(63) Continuation of application No. 16/058,523, filed on Aug. 8, 2018, now Pat. No. 11,013,579, which is a continuation of application No. 14/801,507, filed on Jul. 16, 2015, now Pat. No. 10,080,627, which is a continuation of application No. 12/126,714, filed on May 23, 2008, now Pat. No. 9,119,691.

(51) Int. Cl.
*A61C 7/10*    (2006.01)
*A61C 7/08*    (2006.01)

(52) U.S. Cl.
CPC . *A61C 7/10* (2013.01); *A61C 7/08* (2013.01)

(58) Field of Classification Search
CPC .................................. A61C 7/00; A61C 7/08
USPC .................................................................. 433/6
See application file for complete search history.

(56) References Cited

U.S. PATENT DOCUMENTS

| | | | | |
|---|---|---|---|---|
| 3,837,081 A * | 9/1974 | Kesling | ..................... | A61C 7/08 433/6 |
| 4,793,803 A * | 12/1988 | Martz | ..................... | A61C 7/08 433/6 |
| 5,112,221 A * | 5/1992 | Terry | ..................... | A61C 7/00 433/21 |
| 5,145,364 A * | 9/1992 | Martz | ..................... | A61C 7/08 433/18 |
| 5,820,368 A | 10/1998 | Wolk | | |
| 5,975,893 A | 11/1999 | Chishti et al. | | |
| 6,183,248 B1 | 2/2001 | Chishti et al. | | |
| 6,309,215 B1 | 10/2001 | Phan et al. | | |
| 6,386,864 B1 | 5/2002 | Kuo | | |
| 6,450,807 B1 | 9/2002 | Chishti et al. | | |
| 6,454,565 B2 | 9/2002 | Phan et al. | | |
| 6,471,511 B1 | 10/2002 | Chishti et al. | | |
| 6,524,101 B1 | 2/2003 | Phan et al. | | |
| 6,572,372 B1 | 6/2003 | Phan et al. | | |
| 6,604,943 B2 * | 8/2003 | White | ..................... | A61C 7/00 433/7 |

(Continued)

*Primary Examiner* — Matthew M Nelson
(74) *Attorney, Agent, or Firm* — Wilson Sonsini Goodrich & Rosati

(57) ABSTRACT

The present invention provides orthodontic appliances and systems, and related methods, for applying a force to a target tooth as an appliance is worn by the patient. One positioning appliance includes a tooth positioning appliance having teeth receiving cavities shaped to apply a positioning force to the patient's teeth. The appliance includes a spring-loaded tooth movement device disposed in the appliance so as to engage an attachment mounted on a surface of a patient's tooth and apply a force to the tooth.

20 Claims, 7 Drawing Sheets

(56) References Cited

U.S. PATENT DOCUMENTS

| | | | |
|---|---|---|---|
| 6,607,382 B1 | 8/2003 | Kuo et al. | |
| 6,705,863 B2 | 3/2004 | Phan et al. | |
| 6,783,604 B2 | 8/2004 | Tricca | |
| 6,790,035 B2 | 9/2004 | Tricca et al. | |
| 6,814,574 B2 | 11/2004 | Abolfathi et al. | |
| 6,830,450 B2 | 12/2004 | Knopp et al. | |
| 6,947,038 B1 | 9/2005 | Anh et al. | |
| 7,011,517 B2 * | 3/2006 | Nicozisis | A61C 7/02 433/141 |
| 7,074,039 B2 | 7/2006 | Kopelman et al. | |
| 7,077,647 B2 | 7/2006 | Choi et al. | |
| 7,104,792 B2 | 9/2006 | Taub et al. | |
| 7,121,825 B2 | 10/2006 | Chishti et al. | |
| 7,156,661 B2 | 1/2007 | Choi et al. | |
| 7,160,107 B2 | 1/2007 | Kopelman et al. | |
| 7,192,273 B2 | 3/2007 | McSurdy, Jr. | |
| 7,347,688 B2 | 3/2008 | Kopelman et al. | |
| 7,354,270 B2 | 4/2008 | Abolfathi et al. | |
| 7,448,514 B2 | 11/2008 | Wen | |
| 7,481,121 B1 | 1/2009 | Cao | |
| 7,543,511 B2 | 6/2009 | Kimura et al. | |
| 7,553,157 B2 | 6/2009 | Abolfathi et al. | |
| 7,600,999 B2 | 10/2009 | Knopp | |
| 7,658,610 B2 | 2/2010 | Knopp | |
| 7,766,658 B2 | 8/2010 | Tricca et al. | |
| 7,771,195 B2 | 8/2010 | Knopp et al. | |
| 7,854,609 B2 | 12/2010 | Chen et al. | |
| 7,871,269 B2 | 1/2011 | Wu et al. | |
| 7,878,801 B2 | 2/2011 | Abolfathi et al. | |
| 7,878,805 B2 | 2/2011 | Moss et al. | |
| 7,883,334 B2 | 2/2011 | Li et al. | |
| 7,914,283 B2 | 3/2011 | Kuo | |
| 7,947,508 B2 | 5/2011 | Tricca et al. | |
| 8,152,518 B2 | 4/2012 | Kuo | |
| 8,172,569 B2 | 5/2012 | Matty et al. | |
| 8,235,715 B2 | 8/2012 | Kuo | |
| 8,292,617 B2 | 10/2012 | Brandt et al. | |
| 8,337,199 B2 | 12/2012 | Wen | |
| 8,401,686 B2 | 3/2013 | Moss et al. | |
| 8,517,726 B2 | 8/2013 | Kakavand et al. | |
| 8,562,337 B2 | 10/2013 | Kuo et al. | |
| 8,641,414 B2 | 2/2014 | Borovinskih et al. | |
| 8,684,729 B2 | 4/2014 | Wen | |
| 8,708,697 B2 | 4/2014 | Li et al. | |
| 8,758,009 B2 | 6/2014 | Chen et al. | |
| 8,771,149 B2 | 7/2014 | Rahman et al. | |
| 8,899,976 B2 | 12/2014 | Chen et al. | |
| 8,899,977 B2 | 12/2014 | Cao et al. | |
| 8,936,463 B2 | 1/2015 | Mason et al. | |
| 8,936,464 B2 | 1/2015 | Kopelman | |
| 9,022,781 B2 | 5/2015 | Kuo et al. | |
| 9,119,691 B2 | 9/2015 | Namiranian et al. | |
| 9,161,823 B2 | 10/2015 | Morton et al. | |
| 9,241,774 B2 | 1/2016 | Li et al. | |
| 9,326,831 B2 | 5/2016 | Cheang | |
| 9,433,476 B2 | 9/2016 | Khardekar et al. | |
| 9,610,141 B2 | 4/2017 | Kopelman et al. | |
| 9,655,691 B2 | 5/2017 | Li et al. | |
| 9,675,427 B2 | 6/2017 | Kopelman | |
| 9,700,385 B2 | 7/2017 | Webber | |
| 9,744,001 B2 | 8/2017 | Choi et al. | |
| 9,844,424 B2 | 12/2017 | Wu et al. | |
| 10,045,835 B2 | 8/2018 | Boronkay et al. | |
| 10,111,730 B2 | 10/2018 | Webber et al. | |
| 10,150,244 B2 | 12/2018 | Sato et al. | |
| 10,201,409 B2 | 2/2019 | Mason et al. | |
| 10,213,277 B2 | 2/2019 | Webber et al. | |
| 10,299,894 B2 | 5/2019 | Tanugula et al. | |
| 10,363,116 B2 | 7/2019 | Boronkay | |
| 10,383,705 B2 | 8/2019 | Shanjani et al. | |
| D865,180 S | 10/2019 | Bauer et al. | |
| 10,449,016 B2 | 10/2019 | Kimura et al. | |
| 10,463,452 B2 | 11/2019 | Matov et al. | |
| 10,470,847 B2 | 11/2019 | Shanjani et al. | |
| 10,492,888 B2 | 12/2019 | Chen et al. | |
| 10,517,701 B2 | 12/2019 | Boronkay | |
| 10,537,406 B2 | 1/2020 | Wu et al. | |
| 10,537,463 B2 | 1/2020 | Kopelman | |
| 10,548,700 B2 | 2/2020 | Fernie | |
| 10,555,792 B2 | 2/2020 | Kopelman et al. | |
| 10,588,776 B2 | 3/2020 | Cam et al. | |
| 10,613,515 B2 | 4/2020 | Cramer et al. | |
| 10,639,134 B2 | 5/2020 | Shanjani et al. | |
| 10,743,964 B2 | 8/2020 | Wu et al. | |
| 10,758,323 B2 | 9/2020 | Kopelman | |
| 10,781,274 B2 | 9/2020 | Liska et al. | |
| 10,813,720 B2 | 10/2020 | Grove et al. | |
| 10,874,483 B2 | 12/2020 | Boronkay | |
| 10,881,487 B2 | 1/2021 | Cam et al. | |
| 10,912,629 B2 | 2/2021 | Tanugula et al. | |
| 10,959,810 B2 | 3/2021 | Li et al. | |
| 10,993,783 B2 | 5/2021 | Wu et al. | |
| 11,026,768 B2 | 6/2021 | Moss et al. | |
| 11,026,831 B2 | 6/2021 | Kuo | |
| 11,045,282 B2 | 6/2021 | Kopelman et al. | |
| 11,045,283 B2 | 6/2021 | Riley et al. | |
| 11,103,330 B2 | 8/2021 | Webber et al. | |
| 2002/0192617 A1 | 12/2002 | Phan et al. | |
| 2003/0190576 A1 * | 10/2003 | Phan | A61C 7/00 433/19 |
| 2003/0198911 A1 * | 10/2003 | Knopp | B33Y 10/00 433/24 |
| 2004/0166462 A1 | 8/2004 | Phan et al. | |
| 2004/0166463 A1 | 8/2004 | Wen et al. | |
| 2004/0170941 A1 * | 9/2004 | Phan | A61C 7/36 433/18 |
| 2004/0219471 A1 * | 11/2004 | Cleary | A61C 7/146 433/24 |
| 2004/0229183 A1 * | 11/2004 | Knopp | A61C 7/00 433/213 |
| 2005/0014105 A1 | 1/2005 | Abolfathi et al. | |
| 2005/0048433 A1 * | 3/2005 | Hilliard | A61C 7/00 433/24 |
| 2005/0064358 A1 * | 3/2005 | Nicozisis | A61C 7/02 433/141 |
| 2005/0106525 A1 * | 5/2005 | Knopp | B29C 43/02 433/6 |
| 2005/0186524 A1 | 8/2005 | Abolfathi et al. | |
| 2005/0244768 A1 * | 11/2005 | Taub | A61C 7/146 433/6 |
| 2006/0019218 A1 | 1/2006 | Kuo | |
| 2006/0078841 A1 | 4/2006 | Desimone et al. | |
| 2006/0115782 A1 | 6/2006 | Li et al. | |
| 2006/0115785 A1 | 6/2006 | Li et al. | |
| 2006/0199142 A1 | 9/2006 | Liu et al. | |
| 2006/0223022 A1 * | 10/2006 | Solomon | A61C 7/08 433/8 |
| 2006/0234179 A1 | 10/2006 | Wen et al. | |
| 2007/0065768 A1 * | 3/2007 | Nadav | A61C 7/08 433/18 |
| 2007/0184398 A1 * | 8/2007 | Cronauer | A61C 7/20 433/18 |
| 2008/0050692 A1 * | 2/2008 | Hilliard | A61C 7/08 433/24 |
| 2008/0118882 A1 | 5/2008 | Su | |
| 2008/0160473 A1 | 7/2008 | Li et al. | |
| 2008/0233529 A1 * | 9/2008 | Kuo | A61C 7/08 433/6 |
| 2008/0286716 A1 | 11/2008 | Sherwood | |
| 2008/0286717 A1 | 11/2008 | Sherwood | |
| 2009/0280450 A1 | 11/2009 | Kuo | |
| 2009/0291406 A1 * | 11/2009 | Namiranian | A61C 7/10 433/18 |
| 2010/0055635 A1 | 3/2010 | Kakavand | |
| 2010/0129763 A1 | 5/2010 | Kuo | |
| 2011/0269092 A1 | 11/2011 | Kuo et al. | |
| 2014/0067334 A1 | 3/2014 | Kuo | |
| 2015/0265376 A1 | 9/2015 | Kopelman | |
| 2015/0366637 A1 | 12/2015 | Kopelman et al. | |
| 2015/0366638 A1 | 12/2015 | Kopelman et al. | |
| 2016/0193014 A1 | 7/2016 | Morton et al. | |
| 2016/0242870 A1 | 8/2016 | Matov et al. | |
| 2016/0242871 A1 | 8/2016 | Morton et al. | |

(56) References Cited

U.S. PATENT DOCUMENTS

| | | |
|---|---|---|
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2018/0153648 A1 | 6/2018 | Shanjani et al. |
| 2018/0168776 A1 | 6/2018 | Webber |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0046297 A1 | 2/2019 | Kopelman et al. |
| 2019/0069975 A1 | 3/2019 | Cam et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0338067 A1 | 11/2019 | Liska et al. |
| 2019/0343606 A1 | 11/2019 | Wu et al. |
| 2020/0000553 A1 | 1/2020 | Makarenkova et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0155276 A1 | 5/2020 | Cam et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0390523 A1 | 12/2020 | Sato et al. |
| 2021/0078357 A1 | 3/2021 | Venkatasanthanam et al. |
| 2021/0147672 A1 | 5/2021 | Cole et al. |

\* cited by examiner

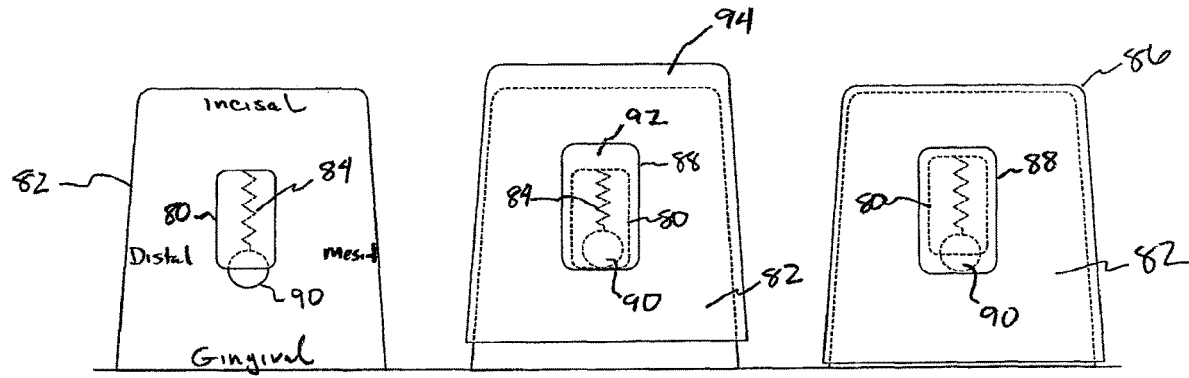
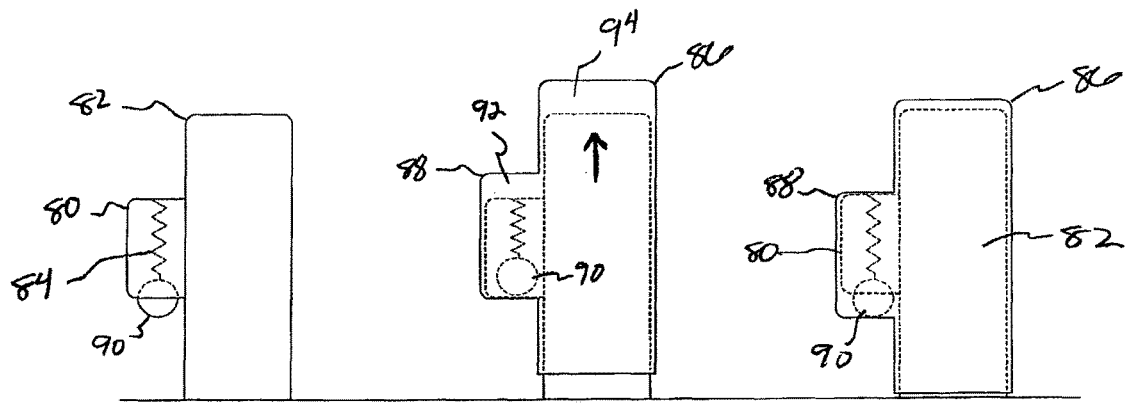
FIG. 6A  FIG. 6C  FIG. 6E
FIG. 6B  FIG. 6D  FIG. 6F

ORTHODONTIC TOOTH MOVEMENT DEVICE, SYSTEMS AND METHODS

CROSS-REFERENCE

This application is a continuation of U.S. application Ser. No. 16/058,523, filed Aug. 8, 2018, now U.S. Pat. No. 11,013,579, issued on May 25, 2021, which is a continuation of U.S. application Ser. No. 14/801,507, filed Jul. 16, 2015, now U.S. Pat. No. 10,080,627, issued on Sep. 25, 2018, which is a continuation of U.S. application Ser. No. 12/126,714, filed May 23, 2008, now U.S. Pat. No. 9,119,691, issued on Sep. 1, 2015, the contents of each are hereby incorporated by reference in their entirety.

BACKGROUND OF THE INVENTION

The present invention relates generally to the field of orthodontics, and more particularly to dental repositioning systems and appliances including a tooth movement device for applying a force to a tooth of a patient.

An objective of orthodontics is to move a patient's teeth to positions where function and/or aesthetics are optimized. Traditionally, appliances such as braces are applied to a patient's teeth by treating practitioner and the set of braces exerts continual force on the teeth and gradually urges them toward their intended positions. Over time and with a series of clinical visits and adjustments to the braces, the practitioner adjusts the appliances to move the teeth toward their final destination.

More recently, alternatives to conventional orthodontic treatment with traditional affixed appliances (e.g., braces) have become available. For example, systems including a series of preformed appliances/aligners have become commercially available from Align Technology, Inc., Santa Clara, CA, under the tradename Invisalign® System. The Invisalign® System is described in numerous patents and patent applications assigned to Align Technology, Inc. including, for example in U.S. Pat. Nos. 6,450,807, and 5,975,893, as well as on the company's website, which is accessible on the World Wide Web (see, e.g., the url "align-.com"). The Invisalign® System includes designing and/or fabricating multiple, and sometimes all, of the aligners to be worn by the patient before the aligners are administered to the patient and used to reposition the teeth (e.g., at the outset of treatment). Often, designing and planning a customized treatment for a patient makes use of computer-based 3-dimensional planning/design tools, such as Treat® from Align Technology, Inc. The design of the aligners can rely on computer modeling of a series of planned successive tooth arrangements, and the individual aligners are designed to be worn over the teeth and elastically reposition the teeth to each of the planned tooth arrangements.

While recently developed orthodontic treatment technologies, such as those described above, represent a considerable advancement in the field of orthodontics, additional and innovative appliance designs remain of interest. For example, in some cases certain movements such as tooth extrusion movements have shown difficult to accomplish and/or require use of various attachments and elastics. As such, improved appliances and techniques are needed for applying more effective tooth extrusion movement forces to the teeth during orthodontic treatment.

BRIEF SUMMARY OF THE INVENTION

The present invention provides improved orthodontic appliances and systems, and related methods, for more effectively applying tooth movement forces (e.g., extrusion force) and repositioning teeth in a desired arrangement. Appliances and systems of the present invention make use of a tooth movement device (e.g., spring-loaded tooth movement device) designed to apply an tooth movement force to a target tooth as an appliances is worn by the patient.

In one aspect, the present invention positioning appliances and systems include a tooth positioning appliance having teeth receiving cavities shaped to apply a positioning force to the patient's teeth. The appliance further includes a spring-loaded tooth movement device disposed in the appliance so as to engage an attachment mounted on a surface of a patient's tooth and apply tooth movement force to the tooth.

In another aspect, systems and methods of the present invention can include an attachment assembly mountable on a surface of a tooth, with the attachment assembly including a spring-loaded device. An orthodontic appliance designed to engage the attachment assembly will be provided and can include a cavity having a relief disposed therein and shaped to receive the spring-loaded device of the attachment assembly. As the appliance is worn by the patient, the attachment assembly with the spring-loaded device coupled with the appliance can function to apply a tooth movement force to the tooth.

For a fuller understanding of the nature and advantages of the present invention, reference should be made to the ensuing detailed description and accompanying drawings. Other aspects, objects and advantages of the invention will be apparent from the drawings and detailed description that follows.

BRIEF DESCRIPTION OF THE DRAWINGS

FIGS. 6A through 6F shows a tooth extrusion system of the present invention including a tooth attachment having a spring-loaded extrusion device, according to another embodiment of the present invention.

DETAILED DESCRIPTION OF THE INVENTION

Figure 1:
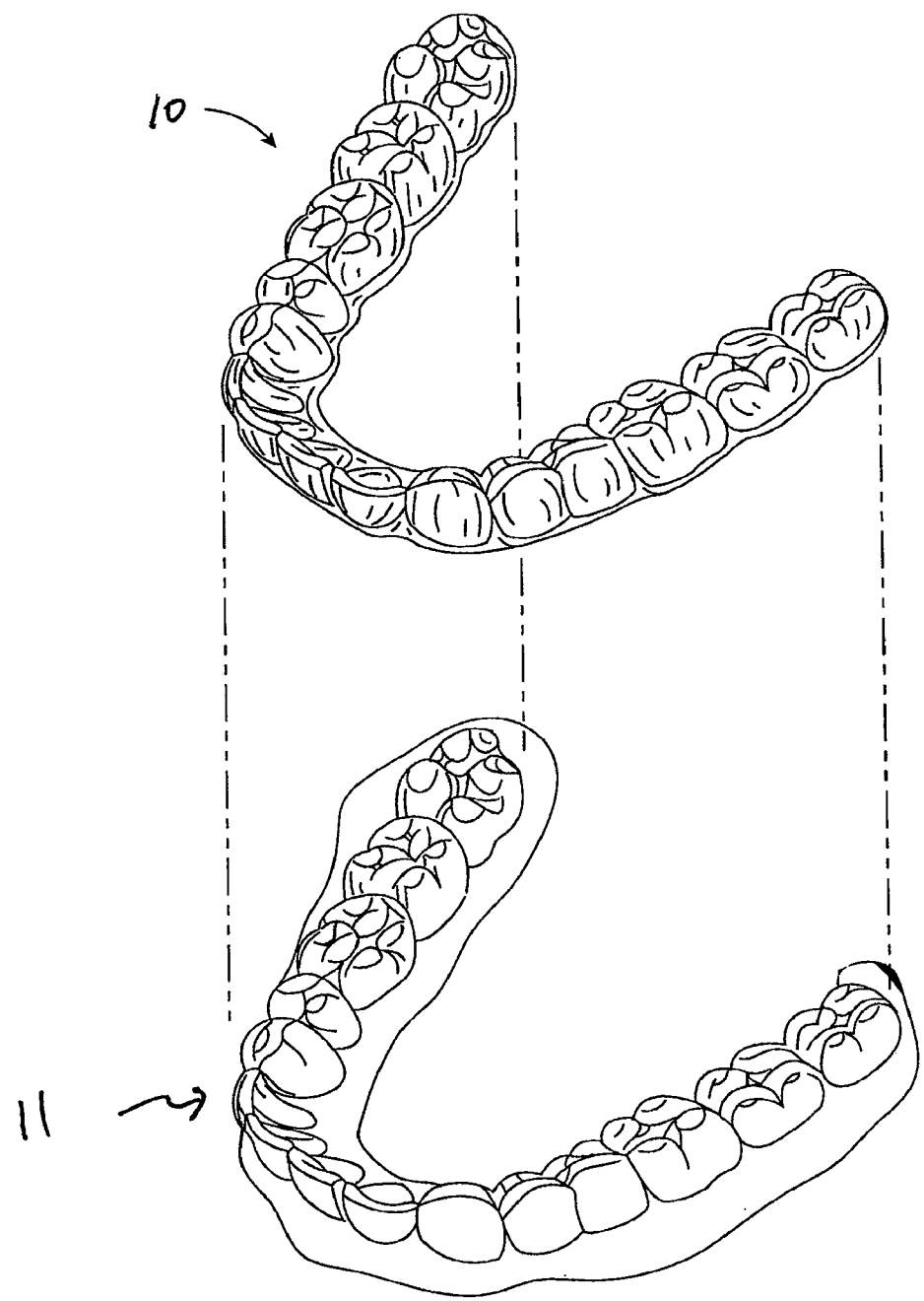
FIG. 1 illustrates a jaw together with an incremental positioning appliance according to an embodiment of the present invention.

The present invention relates to orthodontic positioning of teeth of a patient. Devices and systems, as well as related methods, are described for applying a tooth movement force to a patient's tooth to achieve desired repositioning of the patient's teeth.

Thus, the present invention provides tooth positioning appliances for providing orthodontic treatment to a patient. An orthodontic tooth positioning appliance of the present invention will typically be a patient-removable appliance so as to allow the patient to insert and remove the appliance from the teeth without strictly needing assistance of an orthodontic practitioner. Although, many aspects of orthodontic treatment can occur under the supervision of an orthodontic practitioner (e.g., orthodontist, dentist, etc.). An appliance can include a shell appliance (e.g., polymeric shell appliance) having teeth receiving cavities shaped to receive and apply a resilient positioning force (e.g., tooth repositioning force) to the patient's teeth. The appliance can further include tooth movement device coupled with the appliance or disposed in the appliance and designed to apply tooth movement force to a patient's tooth and elicit tooth movement in a desired direction (e.g., an extrusion movement where the tooth is moved in an occlusal or incisal direction) as the appliance is worn by the patient. A tooth movement device can include a spring-loaded device disposed in the appliance and configured to engage an attachment mounted on a surface of the patient's tooth. Rather than having a device or means for applying resilient force to a tooth that span multiple teeth or span between the opposing jaws as in prior approaches (e.g., elastic bands engaging hooks on brackets/attachment on opposing teeth/jaws), the tooth movement device according to the current invention is positioned adjacent (e.g., directly adjacent) to the tooth to which the movement force is being applied.

Spring-loaded tooth movement devices, disposed in either the appliance or an attachment to the tooth, can include various designs and components for delivery of a tooth movement force to the tooth. Spring-loaded devices will not be limited to spring assemblies per se, and can include both spring-containing assemblies and non-spring assemblies designed to apply a resilient or elastic force to a tooth, such as compression assemblies, cylinder/piston assemblies, elastic members, cantilevers, and the like. Thus, spring-loaded tooth movement devices allow application of a force to the tooth separate from or in addition to any elastic force that may be applied to the tooth by contact (e.g., direct contact of appliances and tooth surface) of an appliance cavity or wall itself, e.g., resilient force due to appliance tooth cavity geometry and elasticity as the appliances is worn by the patient.

Various tooth movements can be accomplished according to the present invention. In one embodiment, a desired tooth movement includes a tooth extrusion movement, and a tooth movement device includes an extrusion device. While exemplary embodiments are provided herein illustrating extrusion type tooth movements, various tooth movement can be accomplished and be selected, for example, based and design and/or positioning of a tooth movement device and/or tooth attachment. In addition to extrusion movements, forces applied to a tooth can be selected to elicit tooth intrusions, rotations, tipping, translation, as well as movements in one or more various directions including mesial, distal, buccal, lingual, incisal, gingival directions.

An appliance of the invention can include a relief with the tooth movement device at least partially disposed in the relief The tooth movement device can be configured to engage (e.g., in a mesial-distal orientation/direction) opposing sides of the attachment mounted on the tooth. Engagement of the tooth movement device and attachment allows application of the desired force to the tooth as the appliances is worn by the patient. The mounted attachment can include inclined surfaces and the tooth movement device can be configured to engage the inclined surfaces on opposing sides of the attachment such that action on the tooth movement device against the inclined surfaces creates a force vector to elicit a tooth movement perpendicular to the direction of tooth movement device action. An appliance can include a single tooth movement device or a plurality thereof. For example, a plurality of tooth movement devices, disposed either in the appliance or a tooth attachment as described below (or both), can be used to engage a single tooth or a plurality of different teeth. In one embodiment, tooth movement devices can be utilized as described herein to engage opposing surfaces of a tooth (e.g., buccal side surface and lingual side surface), for example, and in some cases may deliver a more balanced net force to the target tooth.

Various attachments, including materials and designs, can be utilized according to the present invention to apply the selected extrusion force to a patient's tooth. Attachments can include various materials, e.g., metal, glass, composite, plastic, etc. For example, attachments can be formed by application and in some cases curing of material (e.g., composite) on a tooth surface, with the material applied to the tooth surface using a template, such as a customized template. Customized templates can be produced, for example, using a model of the patient's teeth so the template substantially matches the teeth in an expected position/arrangement at the time of attachment positioning, with the template further including a space or relief for attachment material delivery/application to the patient's tooth. Attachment materials can further include various preformed or pre-fabricated components, such as attachment devices. Materials for attachment positioning, such as templates, attachment materials, etc, can optionally be provided to an orthodontic practitioner for attachment positioning.

Various designs or assemblies can be selected for application of a force as described herein. In one embodiment, a tooth movement device can include a spring clip coupled with the appliance. For example, a spring clip can be disposed on the appliance, with the spring clip including opposing spring arms or prongs configured to engage the mounted attachment when the appliance is worn by the patient. Suitable spring clips are not limited to any particular composition or design and can be selected from various metals, plastics, or other suitable spring-loaded materials for delivering the desired force to the mounted attachment. In another embodiment, a tooth movement includes an extrusion device and can include one or more spring-loaded contact assemblies, such as spring-loaded sliding contact element assemblies positioned to apply force to generally opposing sides of a mounted attachment. In one example, a spring-loaded sliding contact assembly can include a spring and sliding ball assembly.

The present invention includes systems for providing orthodontic treatment to a patient including a plurality of incremental tooth position adjustment appliances. A plurality of appliances can include a set or series of patient removable appliances for positioning a patient's teeth along a treatment path from an initial position, through one or more intermediate tooth arrangements, and toward a final or desired position or arrangement of the patient's teeth (e.g., prescribed or target arrangement). Thus, the plurality of appliances can include appliances for each of any number (e.g., two or more) of intermediate arrangements for positioning the patient's teeth from an initial position toward a final position. Each patient removable appliance can include teeth receiving, and cavities of successive appliances of the plurality can have different geometries shaped to receive and resiliently reposition teeth from one arrangement to a successive arrangement. A plurality of appliances of a system can include at least one appliance including a spring-loaded tooth movement device as described herein. A tooth movement device can be disposed in the appliance (e.g., appliance cavity) so as to engage an attachment mounted on a surface of the patient's tooth and apply a force to the tooth, which may elicit movement of the tooth, e.g., an extrusion movement in an occlusal or incisal direction.

In another embodiment, a system of the present invention can include an attachment assembly mountable on a surface of a tooth, with the attachment assembly including a spring-loaded tooth movement device (e.g., extrusion device). The tooth movement device is positioned adjacent to the tooth to which the movement force is being applied. For delivery of an aspect of orthodontic treatment, an orthodontic appliance designed to engage the attachment assembly will be provided. Similar to above, the appliance can include teeth receiving cavities with a cavity having a relief disposed therein and shaped to receive the spring-loaded device of the attachment assembly. As the appliance is worn by the patient, the attachment assembly with the device coupled with the appliance function to apply a force to the tooth. Various device, extrusion device designs and configurations will be available. In one embodiment, a tooth movement device such as an extrusion device of an attachment assembly can include a spring-loaded sliding contact element assembly (e.g., spring and sliding ball assembly) that engages a surface of a relief of the appliance and applies a force (e.g., extrusion force) to the tooth as the appliance is worn by the patient. Spring loaded sliding contact element assemblies can include various sliding contact elements, such as a sliding ball, semi-ball, probe, etc.

The present invention further includes methods for providing orthodontic treatment to a patient's teeth, for example, utilizing a device or system of the present invention. In one embodiment, a method includes mounting an attachment on a surface of a tooth of a patient and providing a positioning appliance including a spring-loaded tooth movement device disposed in the appliance. In another embodiment, the attachment includes a spring-loaded tooth movement device/assembly, as described further herein. In such an embodiment, the attachment can be provided for mounting to a surface of the patient's tooth, and an appliance further provided that is customized or designed to receive the spring-loaded tooth movement device of the mounted attachment assembly and apply a force to the tooth as the appliances is worn by the patient.

Mounting an attachment can include bonding the attachment to the surface of the patient's tooth. Bonding and attachment positioning can be accomplished according to various techniques, including those commonly employed in orthodontics for mounting or bonding an attachment or object to a patient's tooth. In some instances, the step of mounting an attachment can include merely providing certain materials and/or instructions to an orthodontic practitioner and allowing the practitioner to accomplish the bonding or positioning of the attachment. For example, in one embodiment, a practitioner may be supplied with a template that facilitates attachment placement or bonding to the tooth. Templates can include certain customized templates configured to facilitate attachment bonding and positioning to correspond with a customized appliance that engages the mounted attachment as the appliance is worn by the patient. Providing a customized template can help ensure correct attachment positioning for more optimal delivery of treatment or use of an appliance or system of the present invention. For general discussion of certain techniques and methodologies that may find use in the present invention, including exemplary attachments, mounting/bonding methodologies, templates, etc., see patents and patent applications assigned to Align Technology, Inc., including U.S. Pat. Nos. 6,309,215; 6,830,450; and U.S. patent application Ser. No. 10/863,991.

FIG. 1 shows one adjustment appliance 10 which is worn by the patient in order to achieve an incremental repositioning of individual teeth in the jaw 11. The appliance can include a shell (e.g., polymeric shell) having teeth-receiving cavities that receive and resiliently reposition the teeth. In one embodiment, a polymeric appliance can be formed from a thin sheet of suitable elastomeric polymeric material, such as Tru-Train (e.g., 0.03 inch) thermal forming dental material (Tru-Train Plastics, Rochester, Minnesota). An appliance can fit over all teeth present in an upper or lower jaw, or less than all of the teeth. In some cases, only certain teeth received by an appliance will be repositioned by the appliance while other teeth can provide a base or anchor region for holding the appliance in place as it applies force against the tooth or teeth targeted for repositioning. In some cases, many or most, and even all, of the teeth will be repositioned at some point during treatment. Teeth which are moved can also serve as a base or anchor for holding the appliance as it is worn by the patient. Typically, no wires or other means will be provided for holding an appliance in place over the teeth. In some cases, however, it may be desirable or necessary to provide individual anchors on teeth with corresponding receptacles or apertures in the appliance so that the appliance can apply a selected force on the tooth. Exemplary appliances, including those utilized in the Invisalign® System, are described in numerous patents and patent applications assigned to Align Technology, Inc. including, for example in U.S. Pat. Nos. 6,450,807, and 5,975,893, as well as on the company's website, which is accessible on the World Wide Web (see, e.g., the url "align-.com"). Appliances according to the present invention are further designed to include aspects such that the appliance is configured to operate in conjunction with one or more tooth movement devices disposed in the appliance itself and/or in an attachment mounted to a surface of a patient's tooth, as described herein.

An appliance can be designed and/or provided as part of a set or plurality of appliances. In such an embodiment, each appliance may be configured so a tooth-receiving cavity has a geometry corresponding to an intermediate or final tooth arrangement intended for the appliance. The patient's teeth are progressively repositioned from their initial tooth arrangement to a final tooth arrangement by placing a series of incremental position adjustment appliances over the patient's teeth. The adjustment appliances can be generated all at the same stage or in sets or batches, e.g., at the beginning of a stage of the treatment, and the patient wears each appliance until the pressure of each appliance on the teeth can no longer be felt or has resulted in the maximum allowable tooth movement for that given stage. A plurality of different appliances (e.g., set) can be designed and even fabricated prior to the patient wearing any appliance of the plurality. After wearing an appliance for an appropriate period of time, the patient replaces the current appliance with the next appliance in the series until no more appliances remain. The appliances are generally not affixed to the teeth and the patient may place and replace the appliances at any time during the procedure (e.g., patient removable appliances). The final appliance or several appliances in the series may have a geometry or geometries selected to overcorrect the tooth arrangement, i.e., have a geometry which would (if fully achieved) move individual teeth beyond the tooth arrangement which has been selected as the "final." Such over-correction may be desirable in order to offset potential relapse after the repositioning method has been terminated, i.e., to permit movement of individual teeth back toward their pre-corrected positions. Over-correction may also be beneficial to speed the rate of correction, i.e., by having an appliance with a geometry that is positioned beyond a desired intermediate or final position, the individual teeth will be shifted toward the position at a greater rate. In such cases, the use of an appliance can be terminated before the teeth reach the positions defined by the appliance.

Figure 2:
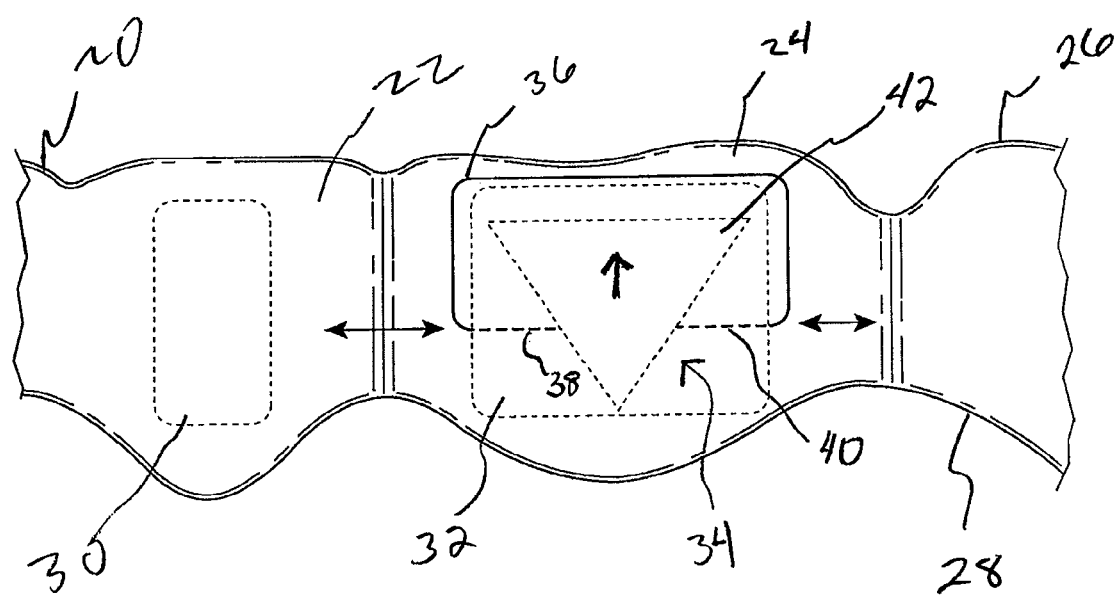
FIG. 2 illustrates a positioning appliance including a spring clip extrusion device according to an embodiment of the present invention.

FIG. 2 illustrates a side view of a positioning appliance including a spring clip extrusion device according to an embodiment of the present invention. The illustrated appliance 20 includes a shell appliance having tooth receiving cavities 22, 24, the appliance 20 having an incisal side 26 and a gingival side 28. Cavity 22 includes relief 30 formed by a protrusion in appliance material, the relief 30 shaped to receive an attachment positioned on a corresponding tooth received in cavity 22. Cavity 24 includes a relief 32 formed at least partially by a protrusion appliance material of cavity 24, the cavity 24 further including extrusion device 34 coupled with the relief 32. The extrusion device 34 includes a spring-loaded clip 36 coupled with the appliance 20. The clip 36 as shown includes a length of material having opposing ends or prongs 38, 40 with the clip coupled with the appliance such that the prongs 38, 40 extend through the relief 32 and to the interior of the relief 32 or tooth receiving cavity 24. A portion of the clip 36 between the prongs 38, 40 can extend about an exterior portion of the relief 32. The clip 36 may optionally be held in place with a securing means such as an adhesive or anchoring mechanism. In use, prongs 38, 40 of the clip interface 36 with an attachment 42 that will be mounted or bonded to a tooth received in the cavity 24. Spring action of the clip 36 as positioned in the appliance 20 is illustrated by bi-directional arrows oriented in a generally lateral direction (e.g., mesial-distal direction). As shown, the attachment 42 will typically have inclined surfaces such that action of the spring prongs against opposing inclined surfaces of the attachment 42 creates a vertical vector (illustrated by the upward pointing arrow) to elicit a movement perpendicular to the direction of the spring arm activation. Thus, engaging of the clip 36 and tooth attachment 42 and action of the clip prongs 38, 40 against the inclined surfaces of the tooth attachment 42, generates an extrusion force on the tooth and can move the tooth in an incisal or occlusal direction.

Figure 3:
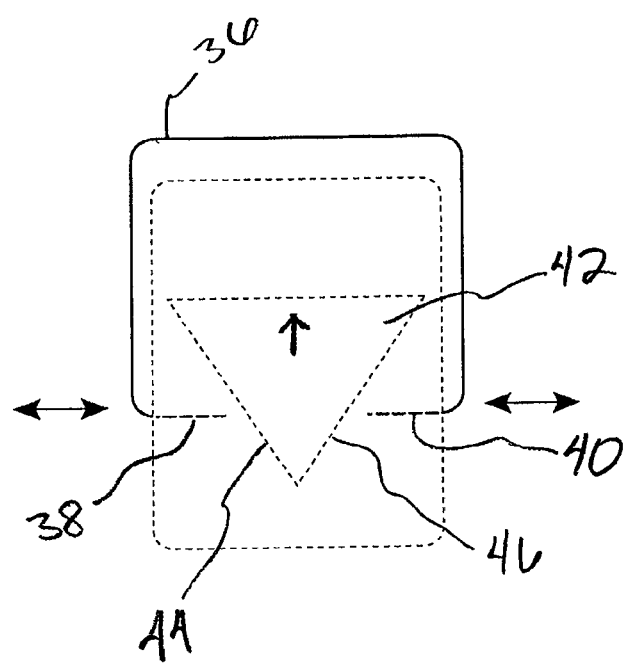
FIG. 3 illustrates a spring clip and shaped tooth attachment for generating an extrusion force on a tooth, according to an embodiment of the present invention.

FIG. 3 shows a conceptual diagram of a spring clip and shaped tooth attachment for generating an extrusion force on a tooth, as illustrated in FIG. 2. The spring clip includes prongs 38, 40 oriented to engage a tooth attachment 42 laterally or in a generally mesial-distal direction. Movement of the prongs 38, 40 of the spring-loaded clip 36 are illustrated by bi-directional arrows. A force can be applied to create space or distance between ends of the prongs 38, 40, e.g., for positioning of the clip 36 to engage the attachment 42 for desired use and application of extrusion force to the teeth. Removal of the spacing force allows the action of the spring-loaded clip 36 to bring the prongs 38, 40 into contact with inclined surfaces 44, 46 of the attachment, respectively. Action of the spring prongs 38, 40 against opposing inclined surfaces 44, 46 of the attachment creates an extrusion force to the tooth by creation of a vertical vector (upward pointing arrow) as the attachment 42 is sort of squeezed out from the opposing prongs 38, 40, thereby eliciting a movement perpendicular to the direction of the spring arm/prong activation.

Figure 4A:
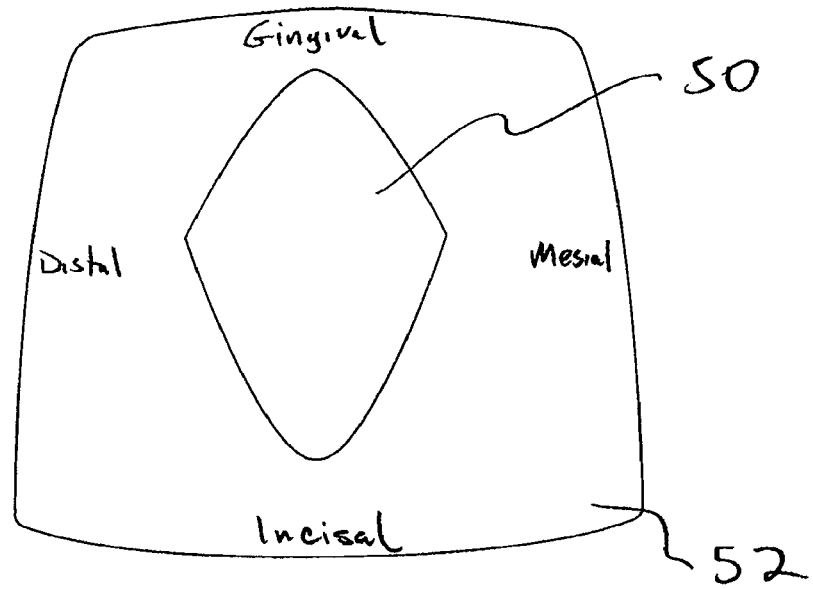
FIGS. 4A through 4C illustrate a shaped tooth attachment and an extrusion device for applying an extrusion force to a tooth, according to another embodiment of the present invention.
Figure 4B:
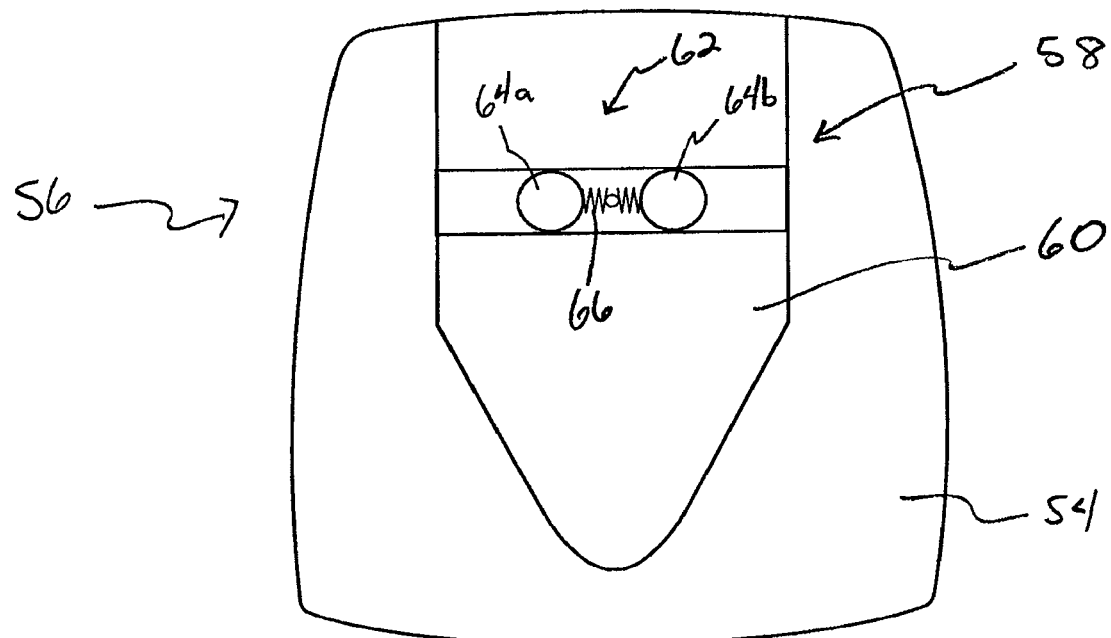
Figure 4C:
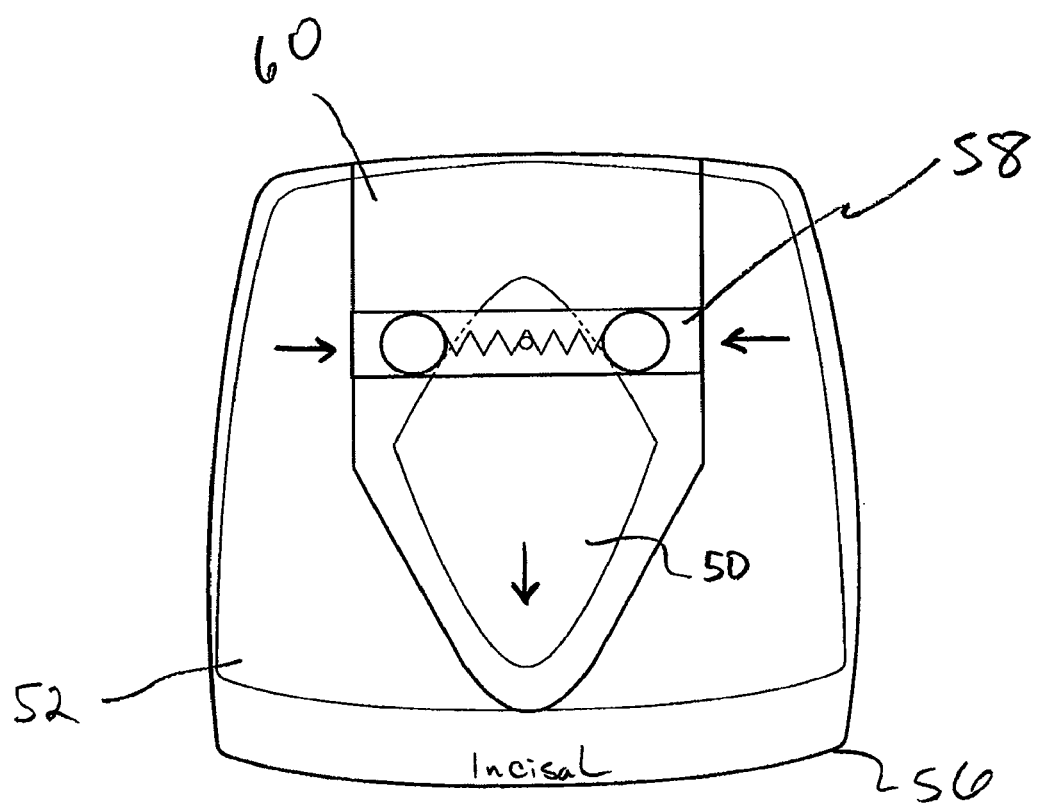

FIGS. 4A through 4C illustrate a shaped tooth attachment and an extrusion device for applying an extrusion force to a tooth, according to another embodiment of the present invention. FIG. 4A illustrates a tooth attachment 50 mounted on a surface of a patient's tooth 52. As illustrated, the attachment 50 includes inclined surfaces that, during use of an appliance, engage an extrusion device of an appliance. The attachment 50 will typically include a triangular or diamond shape, with opposed inclined surfaces slanted or angled in a mesial or distal direction/orientation. FIG. 4B illustrates a tooth receiving cavity 54 of an appliance 56 including an extrusion device 58. The appliance cavity 54 includes a relief 60 with an extrusion device 58 disposed therein. The extrusion device 58 includes spring-loaded sliding contact assembly 62. In the illustrated embodiment, a contact assembly can include a sliding device, such as a sliding ball 64a, 64b, with opposing sliding devices attached to each other about elastics/springs 66 and embedded into the appliance 56. In another embodiment, rather than an elastic/spring attached to opposing sliding devices so as to pull the devices toward each other, sliding devices can each separately include a spring coupled to the sliding device so as to independently push sliding devices toward each other and in the desired direction (not shown). FIG. 4C illustrates the patient's tooth 52 with the mounted attachment 50 positioned in the tooth receiving cavity 54 of the appliance 56 having the extrusion device 58. With the appliance 56 positioned in place, the extrusion device 58 engages the attachment 50 and applies a extrusion force to the tooth 52. A portion of the attachment 50 is disposed between the sliding devices 64a, 64b, of the extrusion device. Elastics/spring-loaded action of the sliding devices 64a, 64b, brings the devices into contact with the inclined surfaces of the attachment 50, applying a lateral force to the attachment 50 as illustrated by force vector arrows. Action of the sliding devices 64a, 64b, of the extrusion device 58 against the inclined surfaces of the attachment 50 creates a vertical force vector for tooth extrusion, as illustrated by the downward pointing arrow in FIG. 4C. The extrusion force can elicit tooth movement in an incisal direction and/or perpendicular to the direction of sliding device action on the attachment 50. As illustrated in FIG. 4C, the relief 60 can be shaped to include a space to accompany movement of the attachment 50 as the tooth 52 is moved in the desired direction without obstruction by a surface or portion of the appliance 56.

Figure 5:
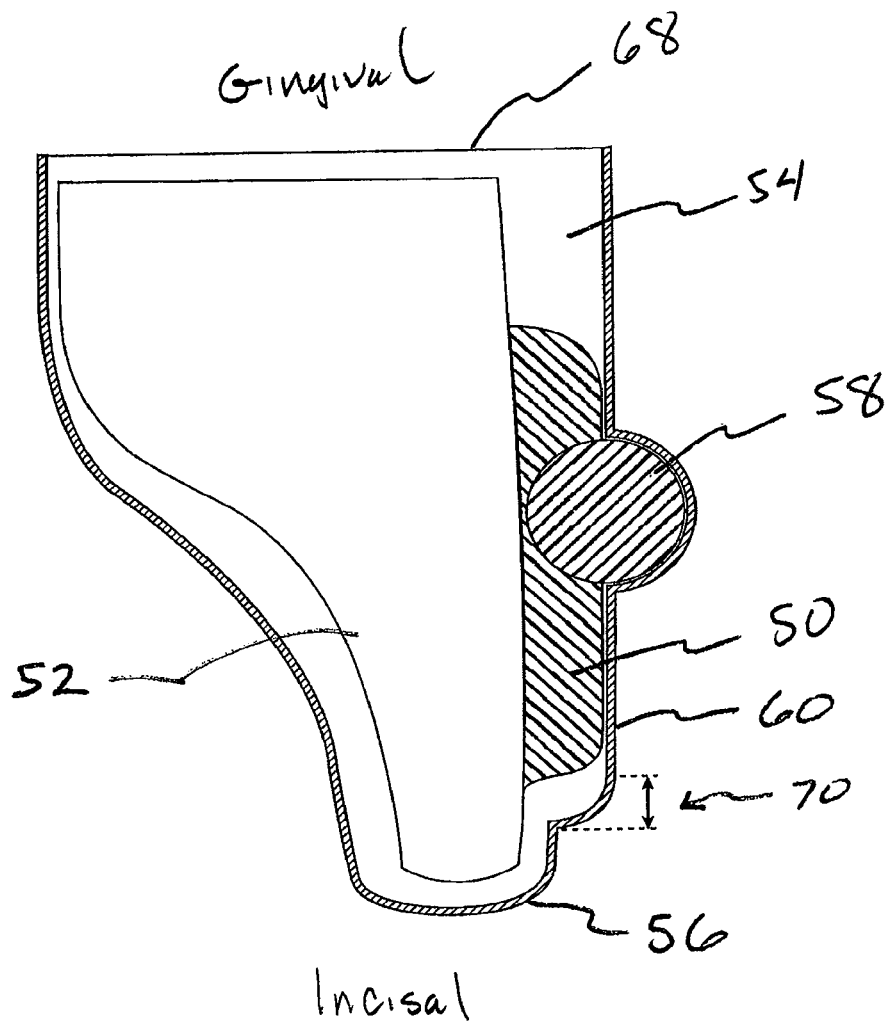
FIG. 5 illustrates a cross-sectional side view of an appliance cavity having an extrusion device engaging an attachment, according to an embodiment of the present invention.

FIG. 5 illustrates a cross-sectional side view of an appliance as illustrated in FIGS. 4A through 4C, showing an appliance cavity 54 having an extrusion device 58 engaging an attachment 50. The appliance cavity 54 is open on a gingival side 68 for positioning of the appliance 56 over the tooth 52, with the tooth 52 disposed in the tooth receiving cavity 54 during use. The attachment 50 is mounted on a surface of the tooth 52 and received in the relief 60 so as to engage the attachment 50 with the extrusion device 58 as illustrated above. The relief 60 includes a space 70 to allow movement of the attachment 50 during extrusion. The tooth receiving cavity 54 can similarly be shaped to accommodate tooth movement. The sliding device of the extrusion device 58 engages the mounted attachment 50 and applies the desired force, which can elicit a desired tooth movement.

In another embodiment, a system of the present invention can include a tooth attachment having a spring-loaded extrusion device. The attachment can include a spring-loaded sliding contact assembly that may allow application of force to a patient's tooth in the desired direction when the attachment is used in conjunction with a corresponding tooth positioning appliance. A tooth positioning appliance will have teeth receiving cavities shaped to receive and the patient's teeth and apply the desired resilient positioning force. The appliance will have a cavity designed to receive a tooth having the attachment with the extrusion device, with the cavity having a relief disposed therein and shaped to receive the spring-loaded device of the mounted attachment. Engagement of the appliance and the tooth mounted attachment as the appliances is worn by the patient allows application of an extrusion force to the tooth. The extrusion device of the attachment can include, e.g., a spring-loaded sliding contact assembly including a spring and sliding ball assembly. An attachment can be in form of a sort of box, with the box including an opening on a side. The opening can be designed to allow a partial extrusion of the contact element (e.g., ball, rounded or hemispheric shaped element, etc.) attached to a spring positioned inside the attachment box. During use, positioning of the appliance on the tooth having the attachment mounted thereon will push the contact element toward the inside of the box. As the appliance is worn by the patient, the spring-loaded contact element will contact a portion of the appliance and exert a force to move the tooth in the desired direction. The appliance will be shaped to accommodate movement of the tooth and attachment within the cavity.

FIGS. 6A through 6F shows conceptual diagrams of a tooth extrusion system of the present invention including a tooth attachment having a spring-loaded extrusion device. FIGS. 6A and 6B respectively illustrate a front view and a side view of an attachment 80 mounted on a tooth 82, with the attachment 80 including an extrusion device 84 with a spring-loaded contact element assembly 90 with a sliding ball and spring. The tooth 82 with attachment 80 is positioned in a tooth receiving cavity of an appliance 86 (FIGS. 6C and 6D). With the appliance 86 in position, the attachment 80 is disposed in a relief 88 in the cavity. Positioning of the appliance 86 compresses the spring as the sliding contact element 90 is pushed inside the attachment 80. The force resulting from the compressed spring presses the sliding contact element 90 against a surface of the appliance and creates a force on the tooth in a direction opposite of action of the contact element 90 against the appliance surface (see force arrow in FIG. 6D indicating force direction). The appliance cavity and the relief 88 will be shaped to include spaces 92, 94 to accommodate movement of the tooth and attachment in the desired direction. FIGS. 6E and 6F illustrate tooth movement following application of the appliance 86 to the patient's tooth 82. After a period of time, the contact element 90 extends out the opening in the attachment 80 as the spring de-compresses, and the tooth moves in a selected direction to occupy space 94 in a portion of the cavity (e.g., incisal portion). Likewise, the attachment 80 is moved into the previously unoccupied space 92.

The present invention can make use of various computer or non-computer implemented techniques for designing appliances as described, as well as implementing various embodiments of the methods described herein. For example, a computer implemented method in one embodiment includes establishing an initial position of a tooth, determining a target position of the tooth in a treatment plan, calculating a movement vector associated with the tooth movement from the initial position to the target position, determining a plurality of appliance components corresponding to the movement vector, and determining a corresponding one or more positions/profiles of a respective one or more elements or aspects of an orthodontic appliance. The extrusion devices may be configured to apply a predetermined force to the patient's tooth/teeth in accordance with the desired tooth movement.

A patient's orthodontic treatment utilizing devices and methods described herein can be accomplished according to a treatment plan. Exemplary methods treatment plan design, as well as appliance design and fabrication are described further below. Typically, appliance and/or treatment plan can optionally, though not necessarily, be accomplished using various computer based applications. It will be recognized that appliance design and fabrication is not limited to any particular method and can include various computer and non-computer based methodologies.

Treatment planning, according to one embodiment of the present invention, is described. Patient data can be collected and analyzed, and specific treatment steps specified and/or prescribed. In one embodiment, a treatment plan can be generated and proposed for a dental practitioner to review. The dental practitioner can accept or request modifications to the treatment plan. Once the treatment plan is approved, manufacturing of appliance(s) can begin. Generating and/or analyzing treatment plans, as discussed herein, can include, for example, use of 3-dimensional orthodontic treatment planning tools such as Treat® from Align Technology, Inc. or other software available from eModels and OrthoCAD, among others. These technologies allow the clinician to use the actual patient's dentition as a starting point for customizing the treatment plan. The Treat® technology uses a patient-specific digital model to plot a treatment plan, and then use a scan of the achieved or actual treatment outcome to assess the degree of success of the outcome as compared to the original digital treatment plan as discussed in U.S. patent application Ser. No. 10/640,439, filed Aug. 21, 2003 and U.S. patent application Ser. No. 10/225,889 filed Aug. 22, 2002.

A system or apparatus for providing a method of the present invention, such as modeling a dental appliance, in one embodiment can include a data storage unit, and a processing unit coupled to the data storage unit and configured to determine an initial position of a tooth, determine a target position of the tooth in a treatment plan, calculate a movement vector associated with the tooth movement from the initial position to the target position, determine a plurality of components corresponding to the movement vector, and determine a profile and/or positioning of corresponding one or more elements/aspects of an appliance.

The data processing aspects of the invention can be implemented in digital electronic circuitry, or in computer hardware, firmware, software, or in combinations of them. Data processing apparatus of the invention can be implemented in a computer program product tangibly embodied in a machine-readable storage device for execution by a programmable processor; and data processing method steps of the invention can be performed by a programmable processor executing a program of instructions to perform functions of the invention by operating on input data and generating output. The data processing aspects of the invention can be implemented advantageously in one or more computer programs that are executable on a programmable system including at least one programmable processor coupled to receive data and instructions from and to transmit data and instructions to a data storage system, at least one input device, and at least one output device. Each computer program can be implemented in a high-level procedural or object oriented programming language, or in assembly or machine language, if desired; and, in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits). Computer-based systems can include network-based systems or may be coupled to a network.

To provide for interaction with a user, the invention can be implemented using a computer system having a display device such as a monitor or LCD (liquid crystal display) screen for displaying information to the user and input devices by which the user can provide input to the computer system such as a keyboard, a two-dimensional pointing device such as a mouse or a trackball, or a three-dimensional pointing device such as a data glove or a gyroscopic mouse. The computer system can be programmed to provide a graphical user interface through which computer programs interact with users. The computer system can be programmed to provide a virtual reality, three-dimensional display interface.

It is understood that the examples and embodiments described herein are for illustrative purposes and that various modifications or changes in light thereof may be suggested to persons skilled in the art and are included within the spirit and purview of this application and the scope of the appended claims. Numerous different combinations are possible, and such combinations are considered to be part of the present invention.

What is claimed is:

1. An orthodontic system for positioning a patient's teeth, the system comprising:
    a shell comprising a plurality of cavities shaped to receive and apply a resilient positioning force to the patient's teeth; and
    a spring-loaded tooth extrusion device attached to the shell and configured to engage an attachment mounted on at least one tooth of the patient's teeth and be at least partially disposed in a cavity of the shell when the shell is worn by the patient, wherein the spring-loaded tooth extrusion device comprises:
    a sliding device, wherein the sliding device is configured to contact the attachment mounted on the at least one tooth of the patient's teeth;
   a spring, wherein the spring is connected to the sliding device at one end, wherein the spring extends horizontally relative to the at least one tooth of the patient's teeth, and wherein, when the shell is worn by the patient, the spring is configured to produce a lateral force to the attachment and thereby facilitate extrusion of the at least one tooth.

2. The system of claim 1, wherein the spring-loaded tooth extrusion device further comprises a second sliding device, wherein the spring is connected to the second sliding device at another end.

3. The system of claim 1, wherein the attachment comprises a triangular shape.

4. The system of claim 1, wherein the attachment comprises a diamond shape.

5. The system of claim 1, wherein the cavity comprises a relief, and wherein the relief is configured to accommodate movement of the attachment relative to the cavity.

6. The system of claim 1, wherein the spring-loaded tooth extrusion device is configured to engage inclined surfaces on opposing sides of the attachment so as to apply the lateral force to the tooth.

7. The system of claim 1, wherein the spring-loaded tooth extrusion device comprises a spring clip disposed in the cavity, the spring clip comprising opposing prongs configured to engage the attached when the shell is worn by the patient.

8. The system of claim 1, wherein the lateral force produces a vertical movement of the tooth relative to cavity.

9. The system of claim 8, wherein the vertical movement comprises an extrusion movement towards an incisal or occlusal side of the cavity.

10. The system of claim 8, wherein the vertical movement of the tooth relative to the cavity is greater than buccal or lingual movement of the tooth relative to the cavity.

11. A method for orthodontically treating a patient's teeth, comprising:
    mounting an attachment on at least one tooth of the patient's teeth; and
    providing an orthodontic tooth positioning appliance comprising a shell and a spring-loaded tooth extrusion device attached to the shell, wherein the shell comprises a plurality of cavities shaped to receive and apply a resilient positioning force to the patient's teeth, wherein the spring-loaded tooth extrusion device is configured to engage the mounted attachment and be at least partially disposed in a cavity of the shell when the shell is worn by the patient;
    wherein the spring-loaded tooth extrusion device comprises:
        a sliding device, wherein the sliding device is configured to contact the attachment mounted on the at least one tooth of the patient's teeth; and
        a spring, wherein the spring is connected to the sliding device at one end, wherein the spring extends horizontally relative to the at least one tooth of the patient's teeth, and wherein, when the shell is worn by the patient, the spring is configured to produce a lateral force to the attachment and thereby facilitate extrusion of the at least one tooth.

12. The method of claim 11, wherein the spring-loaded tooth extrusion device further comprises a second sliding device, wherein the spring is connected to the second sliding device at another end.

13. The method of claim 11, wherein the attachment comprises a triangular shape.

14. The method of claim 11, wherein the attachment comprises a diamond shape.

15. The method of claim 11, wherein the cavity comprises a relief, and wherein the relief is configured to accommodate movement of the attachment relative to the cavity.

16. The method of claim 11, wherein the spring-loaded tooth extrusion device is configured to engage inclined surface on opposing sides of the attachment so as to apply the lateral force to the tooth.

17. The method of claim 11, wherein the spring-loaded tooth extrusion device comprises a spring clip disposed in the cavity, the spring clip comprising opposing prongs configured to engage the attached when the shell is worn by the patient.

18. The method of claim 11, wherein the lateral force produces a vertical movement of the tooth relative to cavity.

19. The method of claim 18, wherein the vertical movement comprises an extrusion movement towards an incisal or occlusal side of the cavity.

20. The method of claim 18, wherein vertical movement of the tooth relative to the cavity is greater than buccal or lingual movement of the tooth relative to the cavity.

* * * * *